(12) United States Patent
Ma

(10) Patent No.: US 8,919,361 B2
(45) Date of Patent: Dec. 30, 2014

(54) MOVABLE BASE WITH WHEELS DEPLOYABLE BY CYCLIC DRIVING ASSEMBLY

(76) Inventor: Oliver Joen-an Ma, Arcadia, CA (US)

( * ) Notice: Subject to any disclaimer, the term of this patent is extended or adjusted under 35 U.S.C. 154(b) by 519 days.

(21) Appl. No.: 13/174,476

(22) Filed: Jun. 30, 2011

(65) Prior Publication Data

US 2012/0024329 A1 Feb. 2, 2012

Related U.S. Application Data

(60) Provisional application No. 61/361,322, filed on Jul. 2, 2010.

(51) Int. Cl.
| | |
|---|---|
| *F16M 13/00* | (2006.01) |
| *A45B 25/00* | (2006.01) |
| *B62B 3/02* | (2006.01) |
| *E04H 12/22* | (2006.01) |
| *F16M 7/00* | (2006.01) |
| *G05F 1/30* | (2006.01) |
| *B62J 11/00* | (2006.01) |

(52) U.S. Cl.
CPC ............ *E04H 12/2238* (2013.01); *A45B 25/00* (2013.01); *B62B 3/02* (2013.01); *F16M 7/00* (2013.01); *G05F 1/30* (2013.01); *B62J 11/00* (2013.01)
USPC .............. 135/16; 280/30; 280/43.17; 74/575; 248/519

(58) Field of Classification Search
None
See application file for complete search history.

(56) References Cited

U.S. PATENT DOCUMENTS

| | | | |
|---|---|---|---|
| 1,063,620 | A | 6/1913 | Thornley |
| 1,261,142 | A | 4/1918 | McNichol |

(Continued)

FOREIGN PATENT DOCUMENTS

| | | |
|---|---|---|
| DE | 200 15 358 | 2/2001 |
| DE | 103 11 537 | 9/2004 |
| EP | 1 243 722 | 9/2002 |
| EP | 2389912 A2 * | 11/2011 |

OTHER PUBLICATIONS

Extended European Search report for European Patent Application No. 11250635.7, mailed on May 8, 2013.

*Primary Examiner* — J. Allen Shriver, II
*Assistant Examiner* — Hilary L Johns
(74) *Attorney, Agent, or Firm* — Knobbe Martens Olson & Bear LLP

(57) ABSTRACT

A ratcheting assembly can include a housing, a ratcheting gear, a first ratchet pawl, a motion translation member, and a ratcheting actuation member. The ratcheting gear can rotatably mount within the housing and include a plurality of ratchet teeth and an eccentric opening. The eccentric opening can include a rotational center of the ratcheting gear. The first ratchet pawl can mount to the housing adjacent to the ratcheting gear to allow rotation in a first direction and to hinder rotation in a second direction opposite the first direction. The motion translation member can mount within the opening such that rotation of the ratcheting gear can cause a movement of the motion translation member via rotation of the eccentric opening. The ratcheting actuation member can mount to the housing and include a second ratchet pawl. The second ratchet pawl can mount to the ratcheting actuation member adjacent to the ratcheting gear such that actuation of the ratcheting actuation member in the first direction can cause a rotation of the ratcheting gear and actuation of the ratcheting actuation member in the second direction opposite the first direction does not cause a rotation of the ratcheting gear.

26 Claims, 9 Drawing Sheets

(56) References Cited

U.S. PATENT DOCUMENTS

| | | |
|---|---|---|
| 1,427,296 A | 8/1922 | Jakubiec |
| 1,940,523 A | 12/1933 | Barclay |
| 2,266,398 A | 12/1941 | Quayle |
| 2,379,476 A | 7/1945 | Cleveland, Jr. |
| 2,383,390 A | 8/1945 | Jacobs |
| 2,784,433 A | 3/1957 | Verhagen |
| 2,952,471 A | 9/1960 | Thorpe |
| 3,025,058 A | 3/1962 | Brumfield |
| 3,179,438 A | 4/1965 | Field |
| 3,259,432 A | 7/1966 | Jackson |
| 3,353,837 A | 11/1967 | Marcyan |
| 3,606,445 A | 9/1971 | Wunderlich |
| 3,633,242 A | 1/1972 | Wasofsky |
| 3,635,491 A | 1/1972 | Drews et al. |
| 3,686,782 A | 8/1972 | Erickson et al. |
| 3,841,631 A | 10/1974 | Dolan |
| 4,000,750 A | 1/1977 | Becher |
| 4,063,616 A | 12/1977 | Gutierrez |
| 4,177,978 A | 12/1979 | Warsaw |
| 4,232,477 A | 11/1980 | Lin |
| 4,249,282 A | 2/1981 | Little |
| 4,270,399 A * | 6/1981 | Knief ............................... 74/129 |
| 4,365,819 A | 12/1982 | Bart |
| 4,412,679 A | 11/1983 | Mahoney et al. |
| 4,417,738 A | 11/1983 | Kendall |
| 4,591,126 A | 5/1986 | Berney |
| 4,804,162 A | 2/1989 | Rice |
| 4,837,955 A | 6/1989 | Grabhorn |
| 4,874,182 A | 10/1989 | Clark |
| 4,902,026 A | 2/1990 | Maldonado |
| 5,024,012 A | 6/1991 | Lovik |
| 5,041,047 A | 8/1991 | Casale |
| 5,102,364 A | 4/1992 | Kubiatowicz |
| 5,108,339 A | 4/1992 | Kieves |
| 5,207,407 A | 5/1993 | Fitzsimmons et al. |
| 5,220,740 A | 6/1993 | Brault |
| 5,248,140 A | 9/1993 | Matherne et al. |
| 5,254,026 A | 10/1993 | Kaiser |
| 5,259,612 A | 11/1993 | Matherne et al. |
| 5,283,595 A | 2/1994 | Krukovsky |
| 5,322,023 A | 6/1994 | Hammond |
| 5,330,213 A | 7/1994 | Peruso |
| 5,338,243 A | 8/1994 | Kieves |
| 5,348,326 A | 9/1994 | Fullenkamp et al. |
| 5,354,049 A | 10/1994 | Matherne et al. |
| 5,354,793 A | 10/1994 | Hudson |
| 5,375,835 A | 12/1994 | Van Nimwegen et al. |
| 5,480,191 A | 1/1996 | Litin et al. |
| 5,599,037 A | 2/1997 | Spickler |
| 5,615,451 A | 4/1997 | Peterson et al. |
| 5,628,522 A | 5/1997 | Hall |
| 5,628,523 A | 5/1997 | Smith |
| 5,636,649 A | 6/1997 | Horvath |
| 5,730,668 A | 3/1998 | Hege et al. |
| 5,743,283 A | 4/1998 | Horvath |
| 5,839,714 A | 11/1998 | Fitzsimmons et al. |
| 5,940,932 A | 8/1999 | LaHay |
| 5,957,145 A | 9/1999 | Plumer |
| 5,979,793 A | 11/1999 | Louis |
| 6,113,054 A | 9/2000 | Ma |
| 6,305,659 B1 | 10/2001 | Metelski |
| 6,336,450 B1 | 1/2002 | Collet |
| 6,367,494 B1 | 4/2002 | Tung et al. |
| 6,374,839 B2 | 4/2002 | Patarra |
| 6,405,990 B2 * | 6/2002 | Davis et al. .................... 248/519 |
| 6,412,746 B2 | 7/2002 | Davis et al. |
| 6,412,747 B2 | 7/2002 | Davis et al. |
| 6,446,930 B1 | 9/2002 | Li |
| 6,478,799 B1 | 11/2002 | Williamson |
| 6,511,033 B2 | 1/2003 | Li |
| D470,305 S | 2/2003 | Clarke |
| 6,523,640 B1 | 2/2003 | Young et al. |
| 6,554,012 B2 | 4/2003 | Patarra |
| 6,554,243 B2 | 4/2003 | Davis et al. |
| 6,594,951 B1 | 7/2003 | Reynolds |
| 6,637,717 B2 | 10/2003 | Li |
| D484,303 S | 12/2003 | Taylor |
| 6,656,065 B2 | 12/2003 | Nye |
| D485,055 S | 1/2004 | Taylor |
| 6,682,055 B1 | 1/2004 | Tomlinson et al. |
| 6,732,752 B2 | 5/2004 | Cohen et al. |
| 6,758,715 B2 | 7/2004 | Banks |
| 6,796,319 B1 | 9/2004 | Patarra et al. |
| 6,827,321 B1 | 12/2004 | Murren et al. |
| 6,869,058 B2 | 3/2005 | Tung |
| 6,889,953 B2 | 5/2005 | Harbaugh |
| D516,297 S | 3/2006 | Smith et al. |
| 7,140,581 B1 | 11/2006 | White |
| 7,163,212 B1 | 1/2007 | Rupp |
| 7,207,570 B1 | 4/2007 | Forbes |
| 7,347,428 B2 | 3/2008 | Edenso |
| D568,603 S | 5/2008 | Smith et al. |
| D573,786 S | 7/2008 | Smith et al. |
| D578,749 S | 10/2008 | Ng |
| 7,503,541 B2 | 3/2009 | Harold et al. |
| 7,513,479 B2 | 4/2009 | Li |
| 7,537,015 B1 | 5/2009 | Molnar, IV et al. |
| 7,584,563 B2 | 9/2009 | Hillstrom et al. |
| 7,614,600 B1 | 11/2009 | Smith et al. |
| 7,641,165 B2 | 1/2010 | Li |
| 7,836,902 B2 | 11/2010 | Tung |
| 7,891,633 B2 | 2/2011 | Li |
| 7,942,377 B2 * | 5/2011 | Harold et al. .................. 248/545 |
| 2001/0013358 A1 | 8/2001 | Patarra |
| 2001/0035485 A1 | 11/2001 | Davis et al. |
| 2001/0045498 A1 | 11/2001 | Davis et al. |
| 2002/0053631 A1 | 5/2002 | Li |
| 2002/0185582 A1 | 12/2002 | Li |
| 2003/0145498 A1 | 8/2003 | Venegas, Jr. |
| 2003/0230692 A1 | 12/2003 | Davis et al. |
| 2004/0056169 A1 | 3/2004 | Harbaugh |
| 2004/0069922 A1 | 4/2004 | Wu |
| 2004/0108439 A1 | 6/2004 | Ma |
| 2004/0195487 A1 | 10/2004 | Harbaugh |
| 2005/0161067 A1 | 7/2005 | Hollins |
| 2005/0189005 A1 | 9/2005 | Smith et al. |
| 2006/0054206 A1 | 3/2006 | Bilotti |
| 2006/0272686 A1 | 12/2006 | Tung |
| 2007/0080277 A1 | 4/2007 | Chen |
| 2007/0082578 A1 | 4/2007 | Haynes |
| 2008/0111046 A1 * | 5/2008 | Tung ............................ 248/521 |
| 2009/0056775 A1 | 3/2009 | Kuelbs |
| 2009/0071519 A1 * | 3/2009 | Ma ................................ 135/33.4 |
| 2009/0174162 A1 | 7/2009 | Gass et al. |
| 2009/0260664 A1 * | 10/2009 | Ma ................................ 135/19.5 |
| 2009/0320341 A1 | 12/2009 | Hillstrom et al. |
| 2010/0065709 A1 | 3/2010 | Ying |
| 2010/0147341 A1 | 6/2010 | Li |
| 2010/0147344 A1 * | 6/2010 | Ma ................................. 135/140 |
| 2010/0269871 A1 * | 10/2010 | Ma ................................ 135/20.3 |
| 2011/0017249 A1 * | 1/2011 | Ma ................................... 135/39 |
| 2011/0232704 A1 | 9/2011 | Li |
| 2012/0024329 A1 | 2/2012 | Ma |
| 2012/0024330 A1 * | 2/2012 | Ma .................................. 135/16 |
| 2012/0025050 A1 | 2/2012 | Ma |
| 2012/0285497 A1 | 11/2012 | Li |
| 2013/0276843 A1 * | 10/2013 | Ma ................................... 135/28 |

* cited by examiner

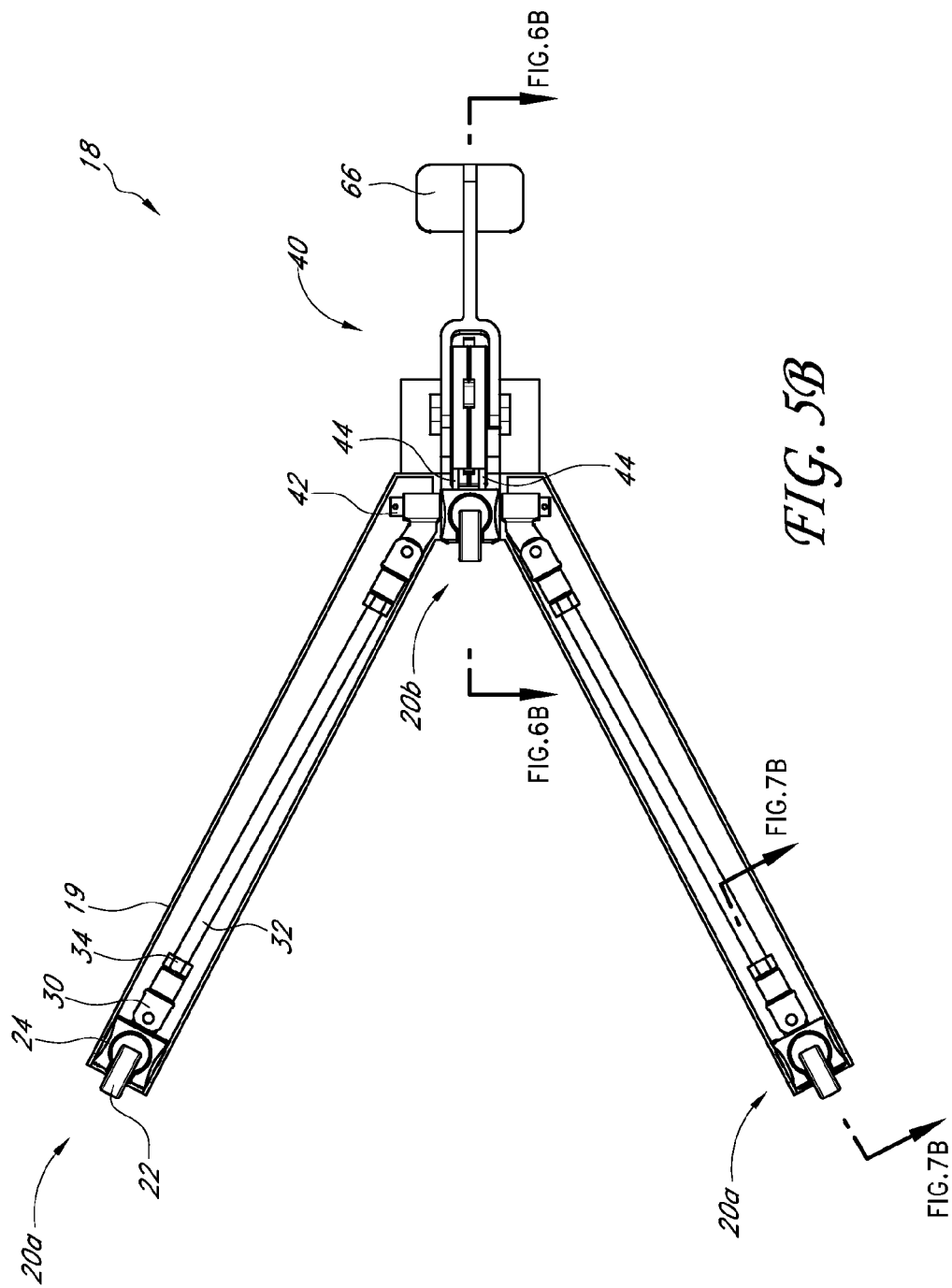

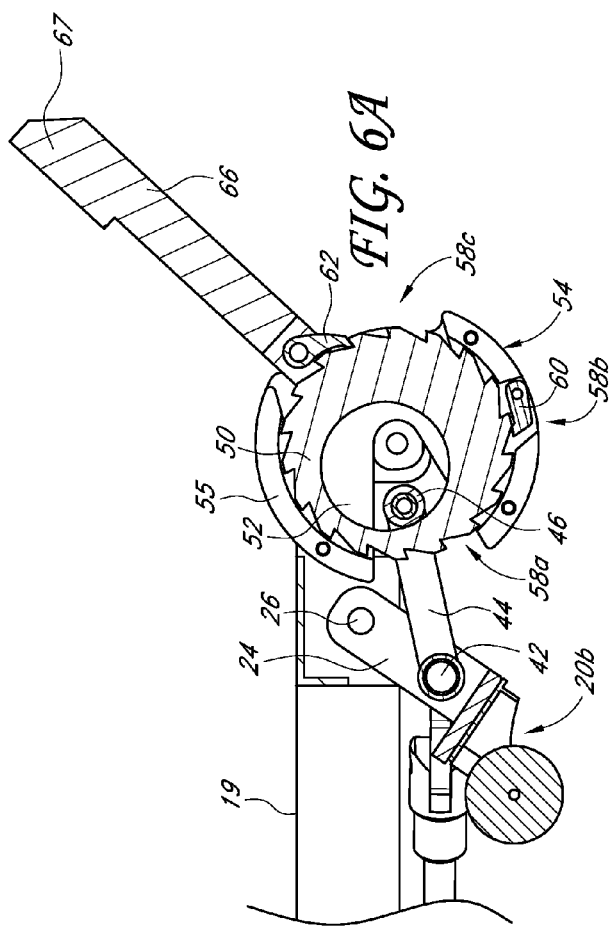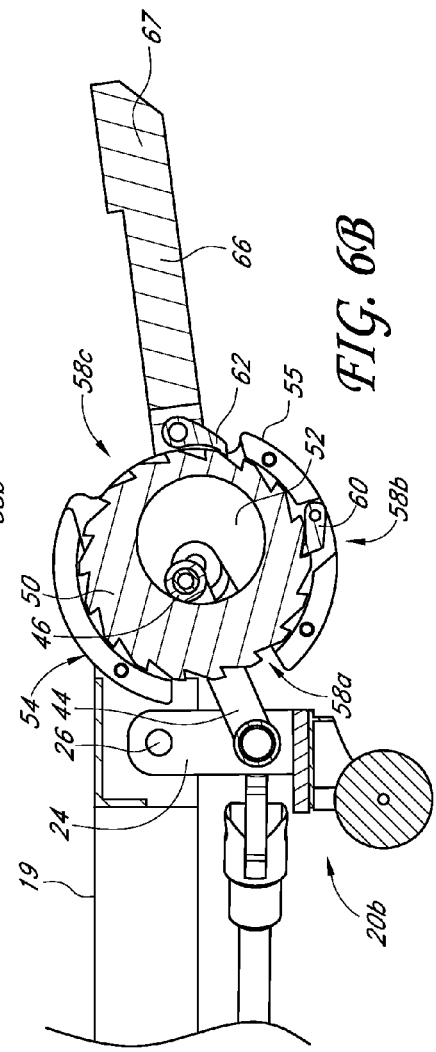

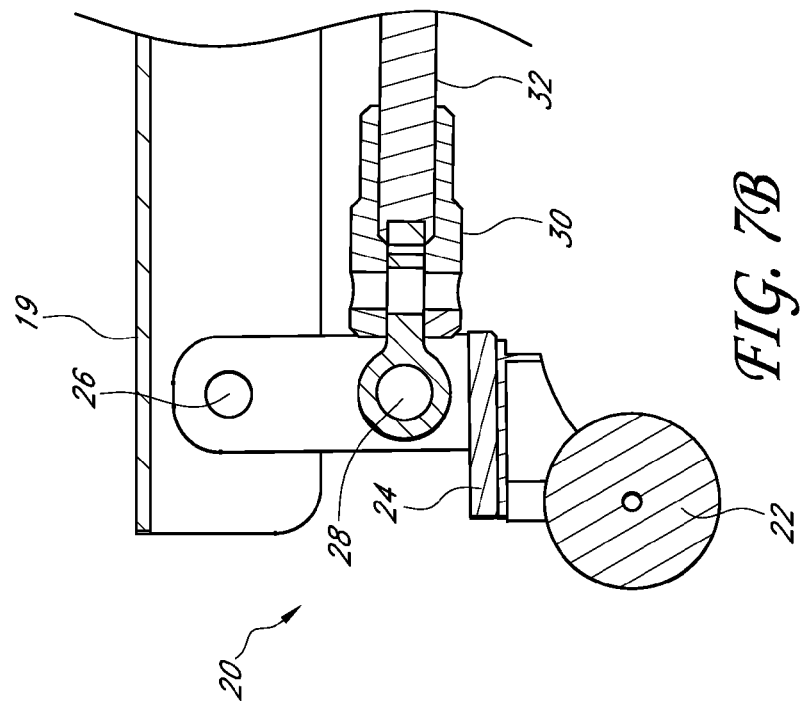
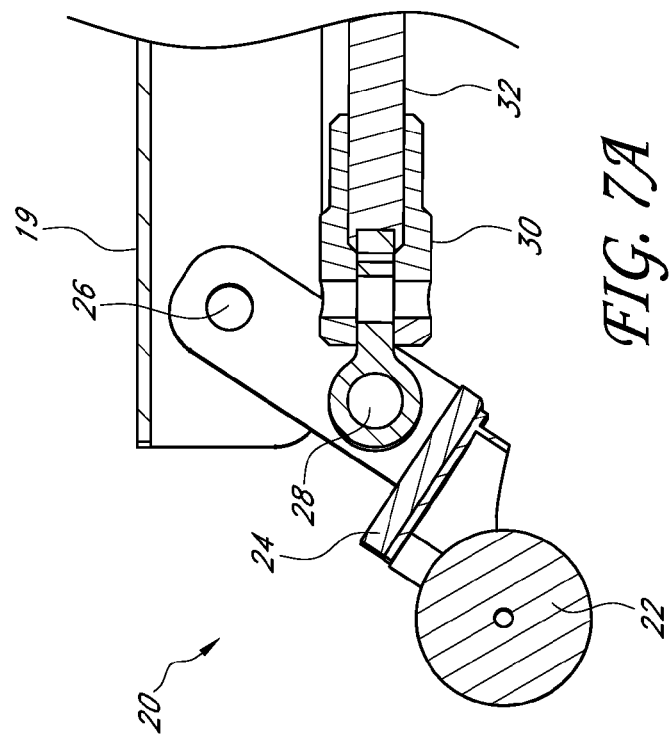

MOVABLE BASE WITH WHEELS DEPLOYABLE BY CYCLIC DRIVING ASSEMBLY

CROSS-REFERENCE TO RELATED APPLICATIONS

This application claims the priority benefit under 35 U.S.C. §119(e) to U.S. Provisional Patent Application Ser. No. 61/361,322 (filed 2 Jul. 2010), the entirety of which is hereby expressly incorporated by reference herein.

BACKGROUND OF THE INVENTIONS

1. Field of the Inventions

The inventions generally relate to load-supporting bases, and more particularly load-supporting bases with retractable wheels.

2. Description of the Related Art

In some cases heavy objects such as ladders and platforms are desired to be portable to enable their use in a variety of locations. For example, it is a common practice at retail stores to keep inventory in high shelves above the merchandise accessible to customers. The inventory is accessed using a portable ladder device that has wheels enabling the ladder to move about the store. A break device is sometimes provided with these ladders to immobilize the ladder when being used to access the inventory.

Other heavy objects are enabled to move or be immobilized by specialized mechanisms. For example, U.S. Pat. App. Pub. No. 2005/0189005 discloses a wheel lifted from the ground by a foot that is raised and lowered by turning a small screw in clockwise and counter-clockwise directions. Although this allows the apparatus to move on and off of the wheels, the mechanism provided may be inconvenient as the rotation of the screw may be difficult when the apparatus bears a heavy load.

SUMMARY OF THE INVENTIONS

One aspect of the inventions is to provide a movable base that is easy to move between configurations where the wheels are either deployed or retracted. For example, in one embodiment a base assembly comprises a load supporting frame, a circular ratcheting gear, a first ratcheting pawly, an elongated member, and a linkage. The load supporting frame can have one or more wheels movable between deployed and undeployed positions. The circular ratcheting gear can rotatably mount to the load supporting frame and have a plurality of teeth and an eccentric opening within the circular ratcheting gear. The first ratcheting pawl can couple to the load supporting frame adjacent the ratcheting gear to form a ratcheting relationship with the ratcheting gear. The ratcheting relationship can substantially allow rotation of the ratcheting gear in only a first direction relative to the first ratcheting pawl. The elongated member can pivotably mount within the opening. The elongated member can have a second ratcheting pawl mounted to the elongated member adjacent to the ratcheting gear to form a ratcheting relationship with the ratcheting gear. The ratcheting relationship can substantially allow rotation of the ratcheting gear in only the first direction relative to the second ratcheting pawl. The linkage can be pivotably mounted within the opening and pivotably mounted to one or more of the wheels. Pivoting of the elongated member in one direction can cause a rotation of the ratcheting gear relative to the first ratcheting pawl and no rotation relative to the second ratcheting pawl. The second ratcheting pawl can be disposed to move with the elongated member to push the ratcheting gear into rotation with the elongated member. Rotation of the ratcheting gear relative to the first ratcheting pawl can cause a movement of the opening that causes a movement of the linkage to move the one or more wheels between the deployed and undeployed positions.

In another embodiment, a base assembly comprises a load supporting frame, one or more wheels, a cyclic driving assembly, and a linkage. The load supporting frame can include one or more recesses and a mounting portion configured to support a load. The one or more wheels can pivotably mount to the load supporting frame and be movable between deployed and undeployed positions extending from said one or more recesses to support and lift the load. The cyclic driving assembly can mount to the frame such that actuation of the driving assembly causes the assembly to move in a first direction to define a continuing cyclic motion of the driving assembly. The linkage can extend between the cyclic driving assembly and the one or more wheels. Thus, the linkage can translate the continuing cyclic motion from the driving assembly to the one or more wheels such that the one or more wheels have a continuing cyclic motion between the deployed and undeployed positions.

In a further embodiment, a ratcheting assembly can include a housing, a ratcheting gear, a first ratchet pawl, a motion translation member, and a ratcheting actuation member. The ratcheting gear can rotatably mount within the housing and include a plurality of ratchet teeth and an eccentric opening. The eccentric opening can include a rotational center of the ratcheting gear. The first ratchet pawl can mount to the housing adjacent to the ratcheting gear to allow rotation in a first direction and to hinder rotation in a second direction opposite the first direction. The motion translation member can mount within the opening such that rotation of the ratcheting gear can cause a movement of the motion translation member via rotation of the eccentric opening. The ratcheting actuation member can mount to the housing and include a second ratchet pawl. The second ratchet pawl can mount to the ratcheting actuation member adjacent to the ratcheting gear such that actuation of the ratcheting actuation member in the first direction can cause a rotation of the ratcheting gear and actuation of the ratcheting actuation member in the second direction opposite the first direction does not cause a rotation of the ratcheting gear.

BRIEF DESCRIPTION OF THE DRAWINGS

Some preferred embodiments of the inventions will now be more particularly described by reference to the accompanying drawings in which:

FIG. 5B is a bottom view of the frame of and control assembly FIG. 4 wherein wheels are deployed;

FIG. 6A is a side cross-sectional view of the control assembly FIG. 5A at 6A-6A;

FIG. 6B is a side cross-sectional view of the control assembly FIG. 5B at 6B-6B;

FIG. 7A is a side cross-sectional view of wheels in the position illustrated in FIG. 5A at 7A-7A; and FIG. 7B is a side cross-sectional view of wheels in the position illustrated in FIG. 5B at 7B-7B.

DETAILED DESCRIPTION OF THE PREFERRED EMBODIMENTS

Figure 1A:
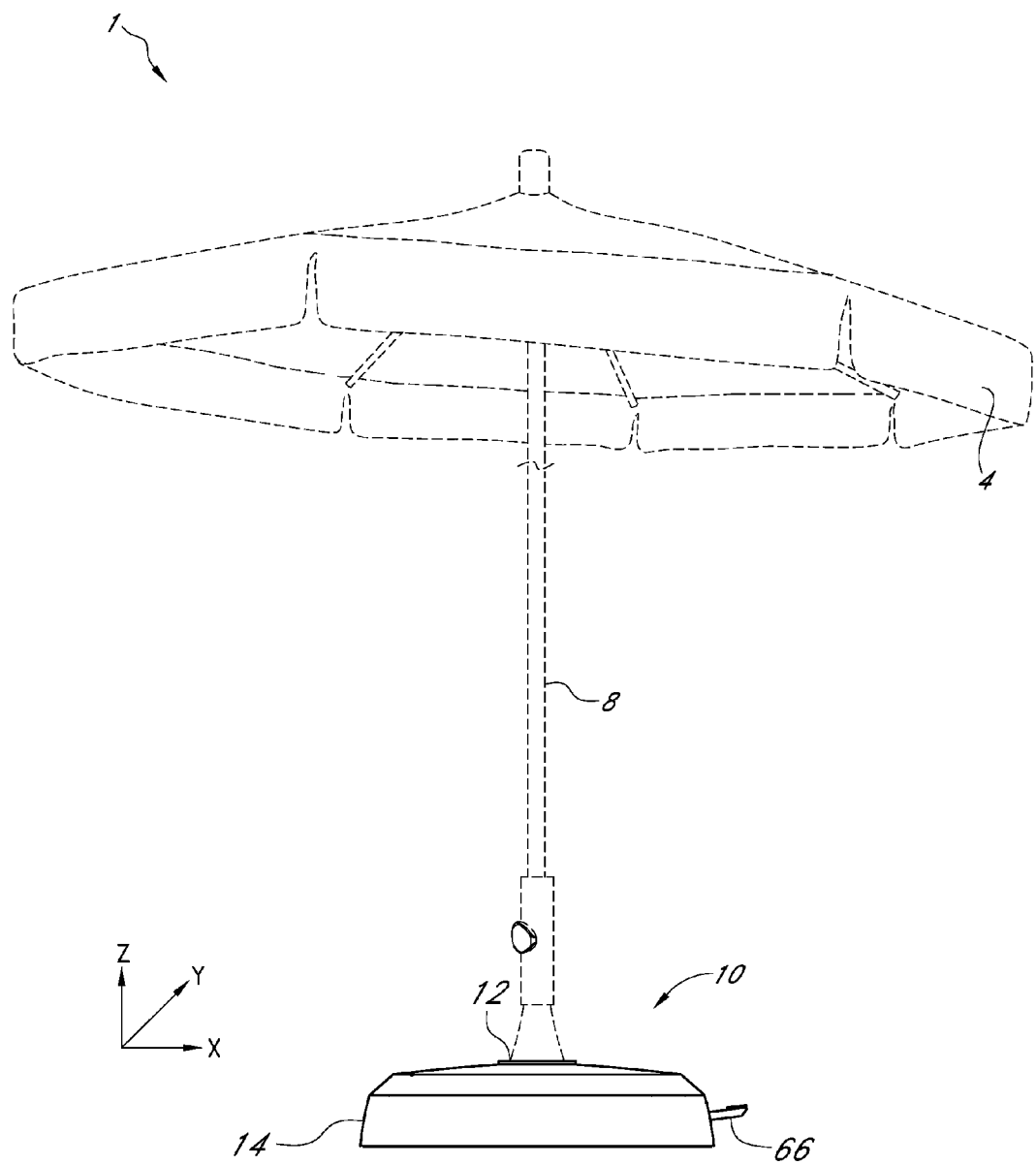
FIG. 1A is a side view of one embodiment of a movable base supporting an umbrella wherein wheels are retracted.
Figure 1B:
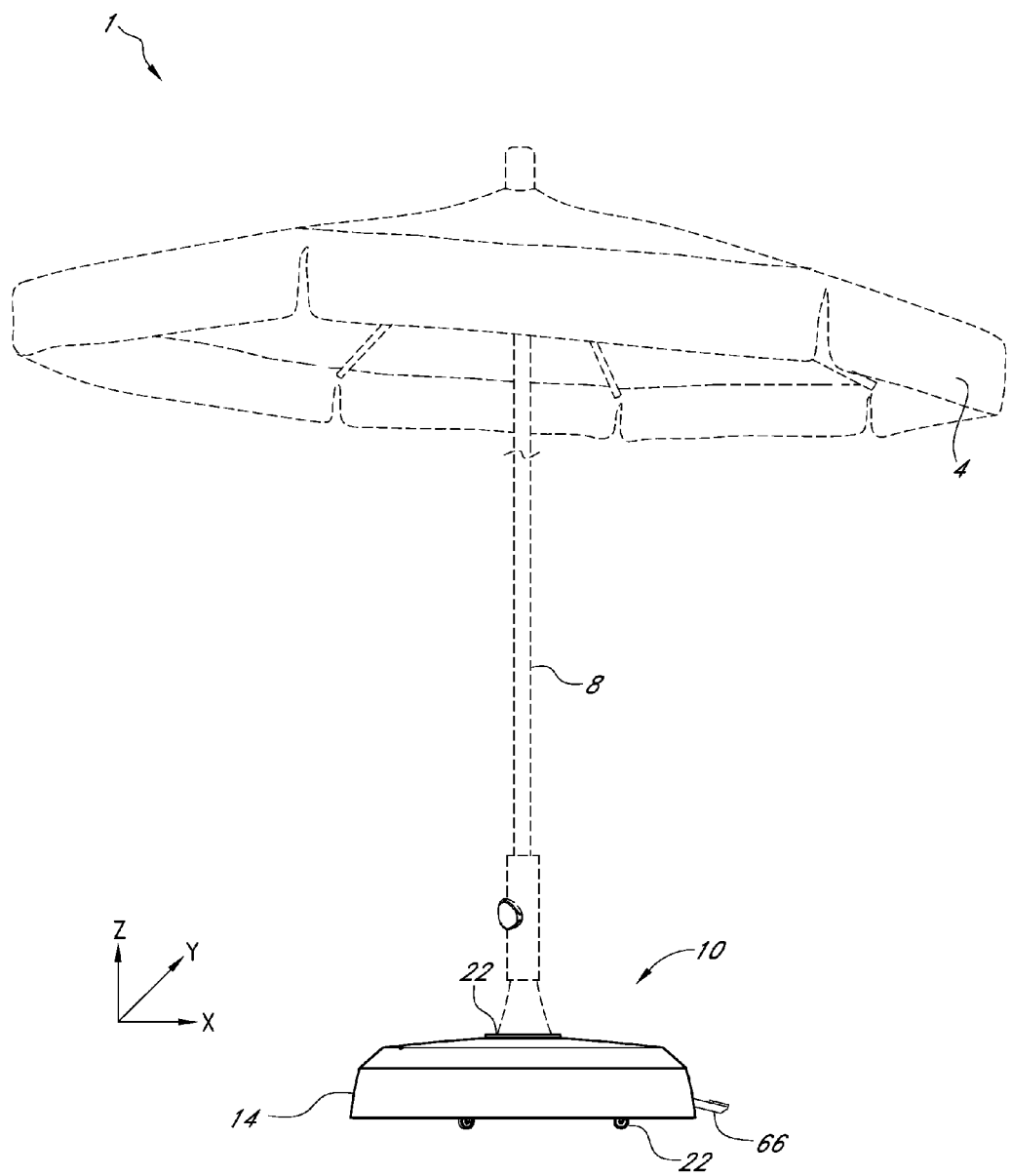
FIG. 1B is a side view of the movable base of FIG. 1A wherein wheels are deployed.
Figure 4:
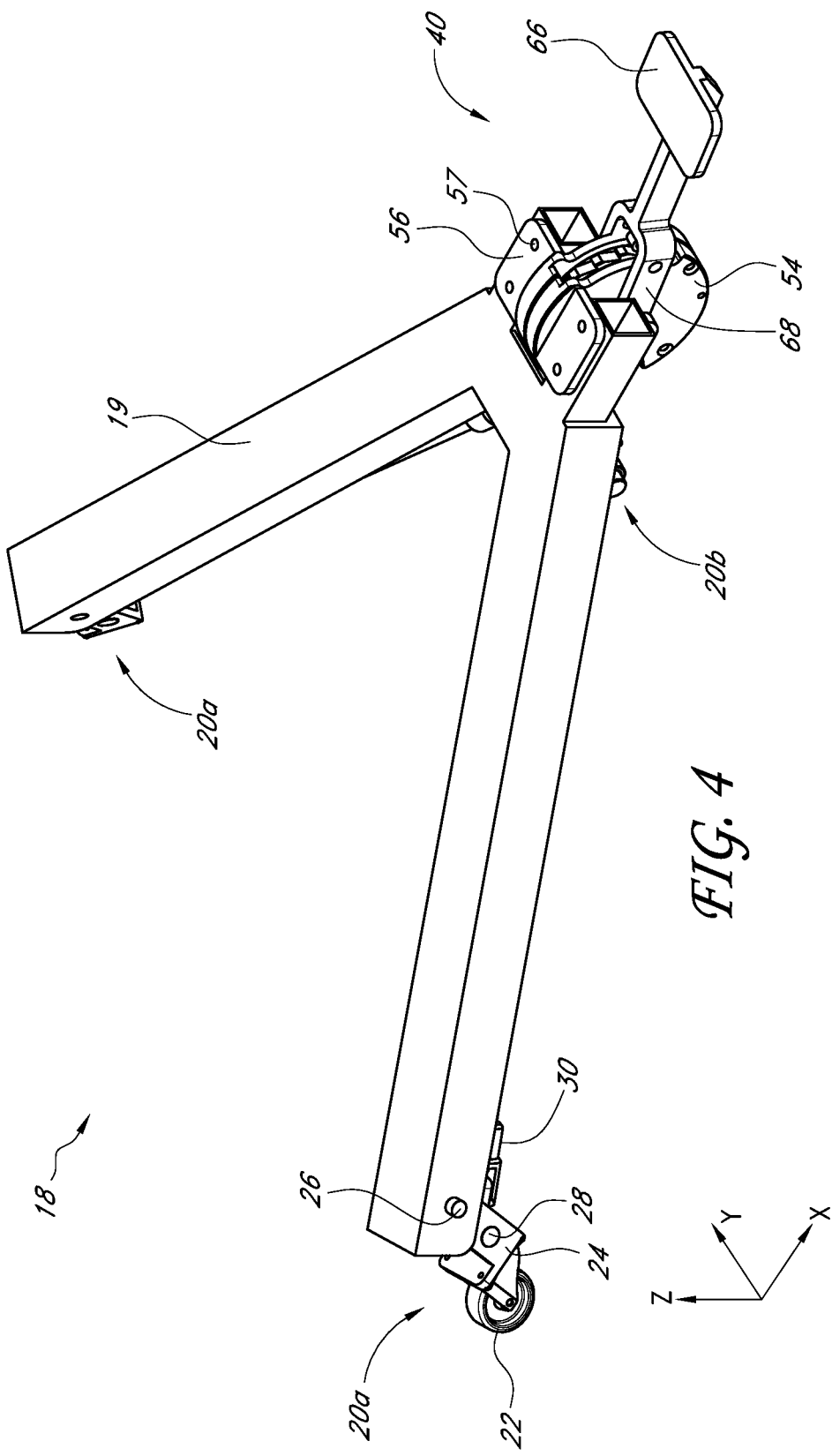
FIG. 4 is an enlarged perspective view of a frame and control assembly of the base of FIG. 3.

FIGS. 1A, 1B, and 4 depict an x-y-z Cartesian coordinate system, with the base assembly 10 primarily lying in the x-y plane. To assist in the description of these components, the following terms are used. As described herein, terms such as "height" refer to distance in the z-direction, and "higher/upward" and "lower/downward" refer to the positive and negative z-direction, respectively. Similarly, terms such as "lateral" will refer to the y-direction and "longitudinal" will refer to the x-direction. However, in other embodiments these axes could be rotated, reversed, or otherwise altered. Terms such as "clockwise" and "counter-clockwise" should be interpreted relative to the perspective of the figures, and it will be understood that these directions may be reversed when other perspectives are used. A detailed description of preferred embodiments of movable base assemblies and their associated methods of use now follows.

FIG. 1A illustrates one embodiment, in which an umbrella system 1 can include an umbrella mounted on a movable base assembly 10. As depicted, the umbrella includes an umbrella canopy 4 and a single umbrella pole 8. However, in other embodiments the umbrella system 1 can have different forms, such as including a cantilevered umbrella. Further, in other embodiments another item to be supported by the base assembly 10 can be substituted for the umbrella, such as a space heater, street lamp, general purpose cart, semi-mobile furniture such as a desk or chair, or the like. The umbrella pole 8, or other items, can mount to a mounting portion 12 on the base assembly 10 to support the rest of the umbrella assembly 1.

As further depicted in FIG. 1B, the base assembly 10 can include a plurality of wheels 22. Thus, the base assembly 10, and the umbrella (or another load) can be easily rolled to different locations on the wheels 22, when deployed. Comparing FIGS. 1A and 1B shows that the wheels 22 can also be retracted.

FIGS. 1A and 1B also depict an actuating member 66, depicted as a lever or foot pedal. As will be discussed further below, the wheels 22 of the umbrella system 1 can be retracted upon actuation of the foot pedal 66. The wheels 22 can be retracted into a cover 14, and the cover can then substantially bear the weight of the umbrella or other load. When the wheels 22 are retracted, the bottom surface of the cover 14 can produce sufficient friction with the ground to substantially hinder sliding or other lateral movement of the umbrella system 1. Thus, in some embodiments the umbrella assembly 1 can stay in a desired position when the wheels are retracted.

It will be noted that, in some embodiments, the wheels 22 can continue to contact the ground on which the base assembly 10 (and the cover 14) rest even when the wheels 22 are in a retracted position. Nevertheless, the wheels 22 can bare a relatively small portion of the weight of the umbrella system 1 in comparison to the weight supported by the cover 14. Thus, even though the wheels 22 can contact the ground, engagement of the cover 14 with the ground can still substantially prevent sliding or rolling of the umbrella system 1. However, in other embodiments the wheels 22 can be configured to not touch the ground when in a retracted position.

Figure 2A:
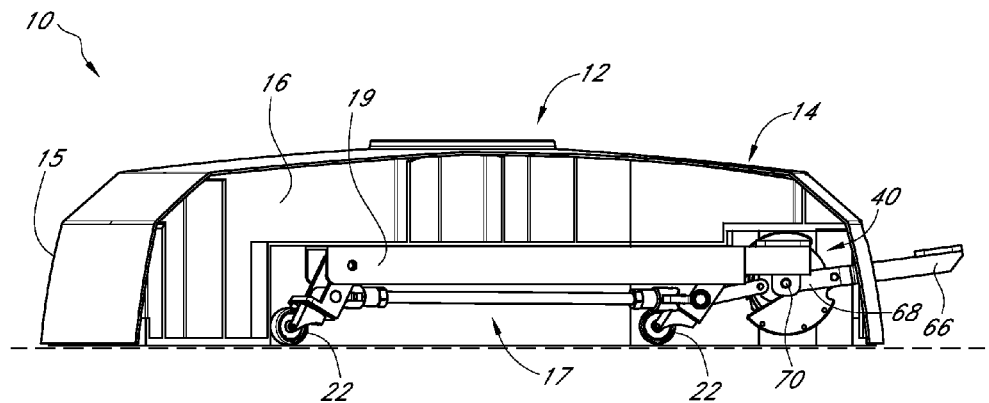
FIG. 2A is a cross-sectional side view of the base of FIG. 1A.
Figure 2B:
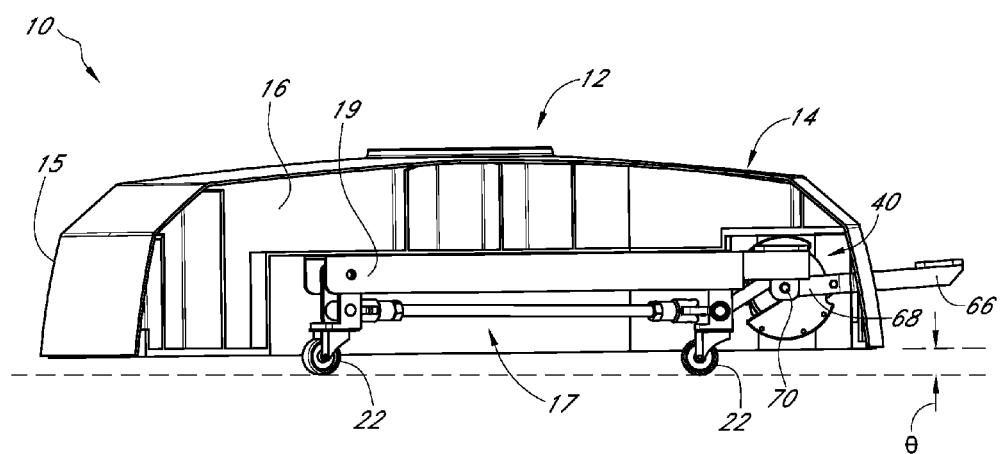
FIG. 2B is a cross-sectional side view of the base of FIG. 1B.
Figure 3:
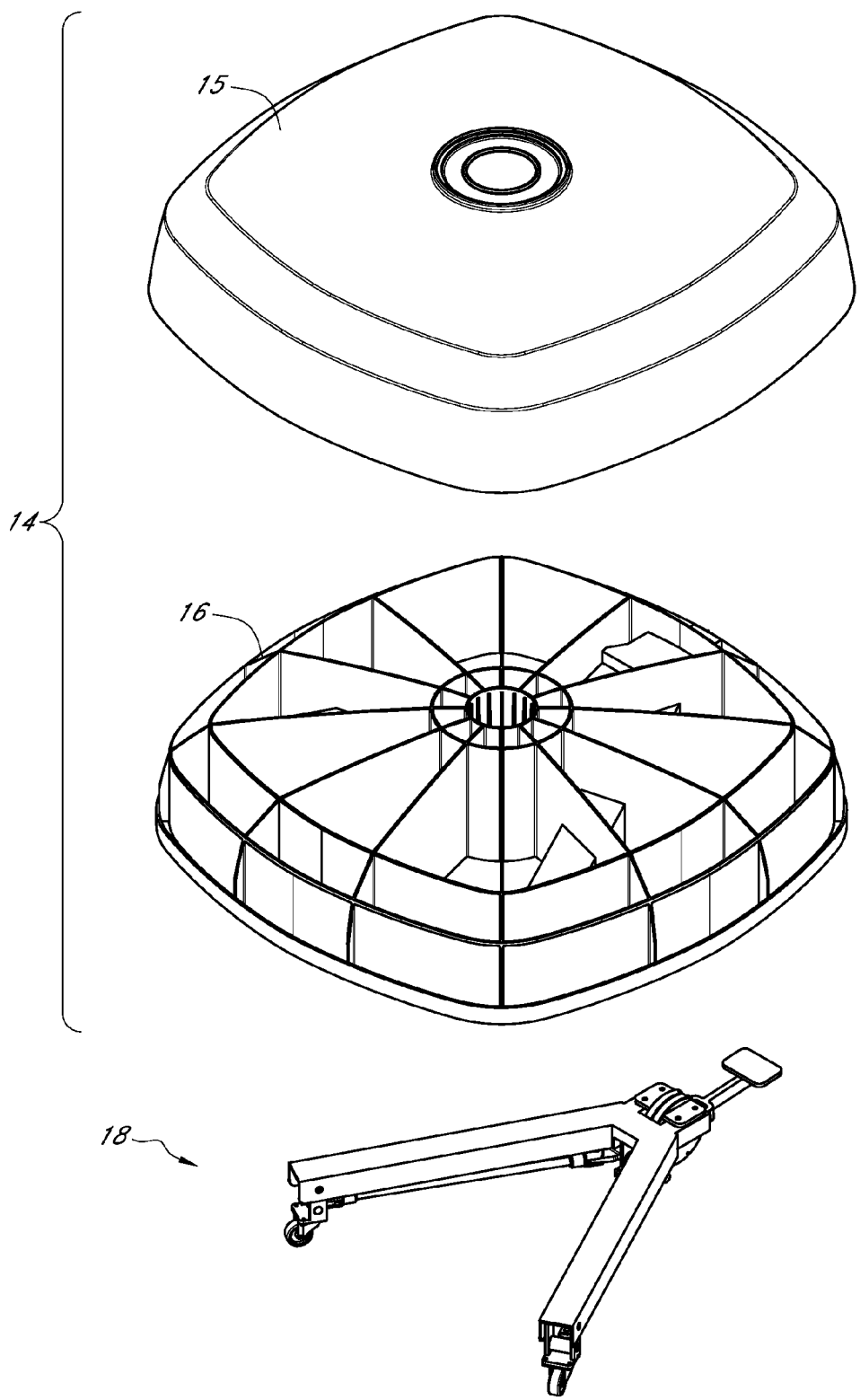
FIG. 3 is an exploded view of the base of FIG. 1A.

FIGS. 2A, 2B, and 3 depict the base assembly 10 and some of its various components. The cover 14, when present, can rest on the remainder of the base assembly 10. For example, in some embodiments the cover 14 can have a 2-part structure, including a cap 15 and a support element 16 that rests on a frame 18, as depicted in FIGS. 2A, 2B, and 3. Thus, the cover 14 can be removable from the frame 18. The cap 15 and the support element 16 can optionally also be independently removable from each other and/or the frame 18. In further embodiments, the cover 14 can be only an aesthetic cap 15, providing no structural function and only covering the frame 18 from view and the elements. In such embodiments a mounting portion 12 can be provided, e.g., on the frame 18. Alternatively, in some embodiments the cover 14 can have no cap 15 or other aesthetic covers. In some embodiments the cover 14 can only consist of a support element 16. In other embodiments, the cover 14 includes a support element 16 configured to be exposed in use. The support element 16 can be a generally skeletal piece between the frame 18 and the cover 14 that provides the cover 14 with structural support. Thus, the deployed wheels 22 can support the frame 18, the frame 18 can support the support element 16, the support element 16 can support the cap 15 and any other portions of the cover 14, and the cover 14 can support a load such as an umbrella. In other embodiments, the cover 14 can include an integral (e.g., a single piece) cap 15 and support element 16.

When the cover 14 is present, as depicted in FIGS. 1A, 2A, the wheels 22 can be withdrawn or retracted into one or more downward facing recesses 17 defined by the cover. The recesses 17 can be shaped to receive the wheels 22, as well as structures associated with the wheels such as the frame 18. Thus, for example, the recesses 17 can have a "V" shape similar to that of the frame 18, as discussed below. The recesses 17 can also substantially define the location of the frame 18 relative to the cover 14, and accordingly to the mounting portion 12 (when on the cover). The recesses 17 can be positioned at a generally central location within the cover 14. Advantageously, this can center the wheels 22 about the mounting portion 12. However, in other embodiments the recesses 17 can be positioned otherwise.

When the wheels 22 are retracted the cover 14 can then, as discussed above, be in direct contact with and be supported by the ground. The wheels 22 can be suspended above the ground by the cover 14, or alternatively bear a relatively small portion of the weight of the umbrella system 1.

The cover 14 is depicted as completely covering the frame 18 and other parts of the base assembly 10, but the cover can also take other forms. In other embodiments, the cover 14 can substantially cover the base but leave certain windows open. Thus, downward facing recesses 17 on the cover 14 that receive the retracted wheels 22 need not be fully enclosed in all embodiments.

As depicted in FIG. 3, the base assembly 10 can include a frame 18. The frame 18 can include one or more wheel assemblies 20 and is depicted as having three in FIG. 4. As depicted, the wheel assemblies are arranged in a "V" orientation (although other orientations and numbers of wheels are possible). The frame 18 can have also have a "V" shape, or another shape that can correspond with the arrangement of the wheel assemblies 20. Two wheel assemblies 20a can be at ends of the V, and a third wheel assembly 20b can be at the angled portion of the V. Each wheel assembly 20 can include a wheel mount 24. The wheel mount 24 can include a housing pivot 26. At the housing pivot 26, the wheel mount 24 can rotatably mount to a housing 19 of the frame 18. This housing 19 can have a generally hollow downward facing portion that receives the wheel assemblies 20, as well as other features described below.

Accordingly, the wheel assembly 20 can be moved between two positions. One position can be a deployed position. The deployed position can be oriented more perpendicularly downward and away from the housing 19 to support the umbrella system 1. The other position can be a retracted position. The retracted position can be oriented more toward an orientation parallel with the housing and allow the cover 14 to support the umbrella system. In the more perpendicular orientation the wheel assembly 20 can extend out of the cover 14, and in the more parallel orientation the wheel assembly 20 can be generally retracted into the cover 14. However, in other embodiments the particular orientations may vary. For example, in some embodiments the retracted position can orient the wheel assembly 20 perpendicularly upward and away from the ground.

Figure 5A:
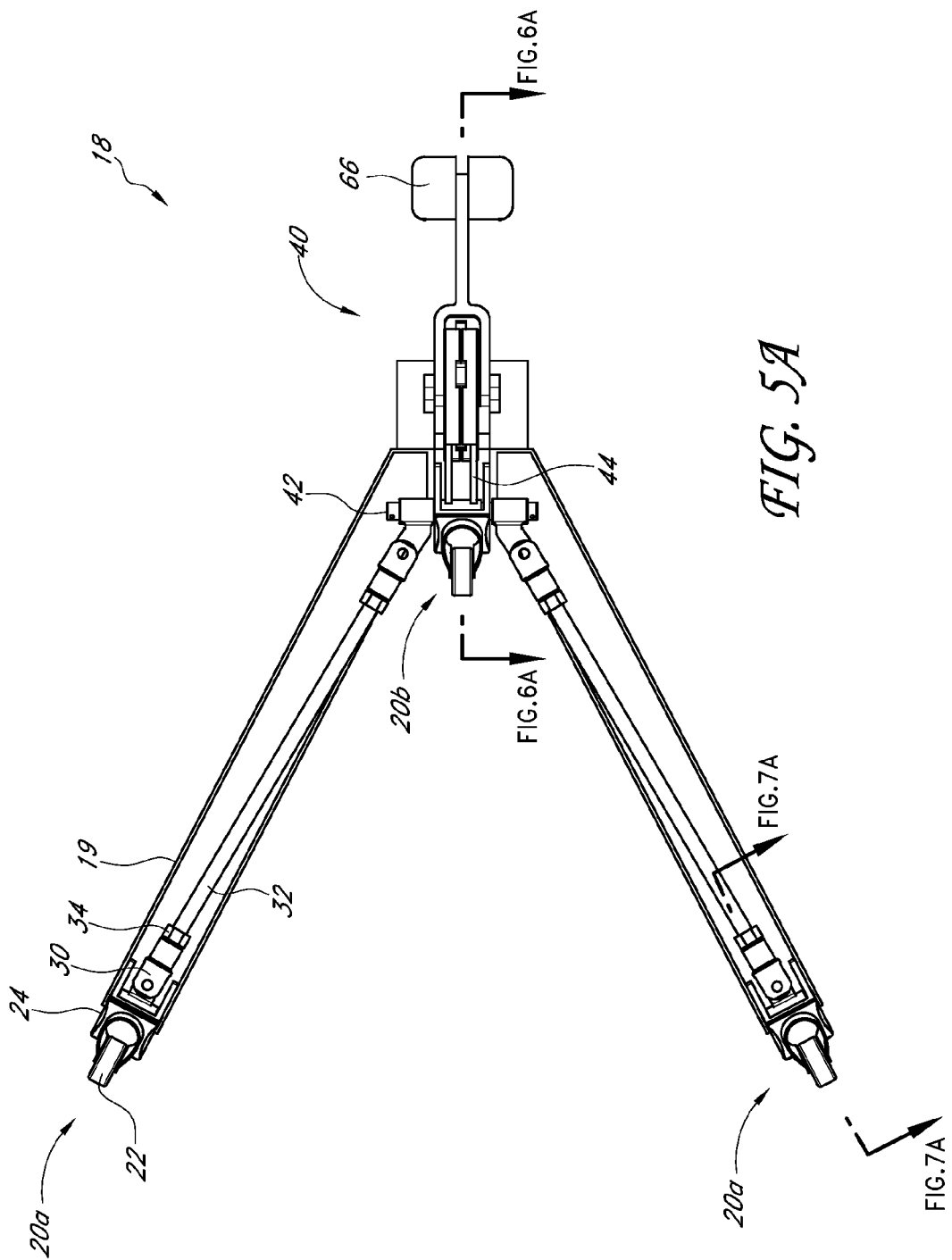
FIG. 5A is a bottom view of the frame and control assembly of FIG. 4.

The wheel assemblies 20a at the ends of the frame 18 can additionally include a control pivot 28 on the wheel mounts 24, as best depicted in FIG. 4. Through the control pivots 28, the wheel assemblies 20a can mount to couplers 30. The couplers 30 can rotatably mount to transmission members 32, as best depicted in FIG. 5A. Thus, the couplers 30 can provide two axes of rotation between the wheel assemblies 20a and the transmission members 32, and provide a universal joint. The couplers 30 can attach to the wheel assembly 20a by a pin joint at the control pivot 28, forming one of the axes of rotation. The other axis of rotation can be integral to the couplers 30. Finally, the couplers 30 can connect to an end of the transmission members 32 by a screw fit. The screw fit can be formed by a male threaded portion on the transmission member 32 and a female threaded portion on the coupler 30, although other combinations are possible.

The transmission members 32 can be in the form of extended rods and can attach by a similar screw fit to similar couplers 30 at an opposite end of the transmission members 32. These couplers 30 can similarly provide two axes of rotation between the transmission member 32 and the wheel assembly 20b at the angled portion of the frame 18 or "V" shape. Thus, the two wheel assemblies 20a at the ends of the V can connect by the transmission members 32 to the third wheel assembly 20b at a center of the V. Each of these wheel assemblies 20 can connect to the housing 19 at a housing pivot 26, such that they can rotate between retracted and deployed positions (the housing pivot 26 for the third wheel assembly 20b best depicted in FIGS. 6A, 6B). Further, via the connection through the transmission members 32, the wheel assemblies 20 can move in unison between the retracted and deployed positions. More specifically, in some embodiments the wheel assemblies 20 and the transmission members 32 can be configured such that aspects of the rotational motion of each wheel can be approximately equal (e.g., each moving through similar angles of rotation).

However, in some embodiments, the rotational motion of each wheel 22 can slightly differ due to the geometry of the couplers 30, transmission members 32, and the housing 19 to which they are connected. For example, as depicted in FIG. 2B, the wheels 22 may extend differing lengths or distances from the cover 14, putting the cover 14 at an angle θ relative to the ground. In such embodiments, the base assembly 10 can be configured to ensure that each wheel 22 extends beyond the cover 14 in the deployed position, and does not extend beyond the cover in the retracted position. For example, in some embodiments the clearance between the bottom of the wheels 22 and the cover 14 in the deployed position can be sufficient to ensure that all wheels extend past the cover. In further embodiments, the wheel mounts 24 can have different lengths, such that the vertical position of each of the wheels 22 varies a different amount with its rotational position. Further, in some embodiments the bottom surface of the cover 14 can be at an angle relative to the wheels 22, such that they can extend an approximately equal amount therefrom. For example, the cover 14 (and/or the base assembly 10) can be configured such that the mounting portion 12 is generally oriented perpendicular to the ground when the wheels 22 are in a retracted position. Thus, e.g., an umbrella pole 8 mounted in the mounting portion 12 can also stand perpendicular to the ground when the wheels 22 are in a retracted position.

In the depicted embodiment, each of the wheel assemblies 20 can be directly or indirectly moved by a control assembly 40. The control assembly 40 can be disposed at the point, center, or angled portion of the V shape of the housing 19, but can be positioned elsewhere in other embodiments. As will be described further below, the middle wheel assembly 20b can be directly connected to the control assembly 40. The motion of the middle wheel assembly 20b can substantially control the motion of the other wheel assemblies 20a. In some embodiments, the wheel assemblies 20a, 20b can move in unison under the control assembly 40.

As best depicted in FIGS. 5A, 5B, the middle wheel assembly 20b can be rotatably mounted to the couplers 30 by an extended pin 42. As further depicted in FIGS. 6A, 6B, the extended pin 42 can be somewhat similar to the control pivot 28 as described above, providing a connection to the couplers 30. The extended pin 42 can extend through and beyond the wheel mount 24, mounting to the couplers 30 on opposite sides of the wheel mount. In the middle of the wheel mount 24, the pin 42 can rotatably mount to two rotation connectors 44, which can be in the form of extended bars. It will be noted that not all of the wheel mount 24, the couplers 30, and the rotation connectors 44 need rotatably mount to the extended pin 42 in all embodiments. For example, in some embodiments one or more of these can be rotationally fixed with the pin 42, still preserving relative rotation with the other elements.

The rotation connectors 44, depicted as extended bars, can mount to the pin 42 at a first end, and mount to a rider 46 at a second end. The rider 46 at the second end can mount within a hole or opening 52 of a gear 50. In some embodiments the rider 46 at the second end can comprise a friction reducing member. In some embodiments, the friction reducing member can be a roller. The roller can include a set of bearings that can reduce friction between said rider and the gear 50. In other embodiments, the friction reducing member can have a low-friction surface, and thus act as a slider. In other embodiments, the rider 46 at the second end can be provided with a friction-reducing substance such as grease or oil. Further, in some embodiments the rider 46 at the second end can be without a friction reducing member.

As best depicted in FIGS. 6A, 6B, the gear 50 can be substantially circular. Further, the gear 50 can include a plurality of teeth. In the depicted embodiment, the teeth on the gear 50 are disposed along the circumference and oriented radially. Further, the depicted gear teeth provide a substantially concave surface on one side and a substantially convex surface on the other side. The concave surface can be on a counter-clockwise-facing side and the convex surface can be on a clockwise-facing side. This arrangement can facilitate a ratcheting relationship, as further described below.

The hole 52 in the gear 50 can be asymmetric within the gear. For example, in some embodiments the hole 52 can have a center offset from a center of the gear 50. Further, the hole 52 can have a substantially smooth shape such as a circle. Thus, as will be discussed further below, the motion of the rotation connectors 44 can be guided by the movement of the rider 46 within this hole 52 as the gear 50 turns, to control the rotation of the wheel assemblies 20.

The gear 50 can be enclosed within two side covers 54 that can form a housing for the gear. Each side cover 54 can have a lid-like shape. More particularly, the side covers 54 can each have a broad portion with arcing flanges 55 along their peripheries. The arcing flanges 55 can provide an inner, generally circular receiving portion within each cover 54 that can generally match and accommodate the shape and rotation of the gear 50. Further, the two side covers 54 can have generally matching shapes and mounting holes, such that they can come together on either side of the gear 50 and attach to each other. When together, the side covers 54 and their receiving portions can form an enclosed space for the gear 50.

Each side cover 54 can additionally include a mounting structure 56, best depicted in FIG. 4. The mounting structure 56 can be a flange or other wing-like structure extending in a direction opposite the arcing flanges 55. Mounting elements 57 can be disposed on the mounting structure 56. The mounting elements 57 (e.g., screw holes) can facilitate attachment of the side covers 54 to the housing 19. Thus, the side covers 54 can substantially secure the gear 50 to the housing 19, while allowing rotation relative to the housing. In some embodiments, the umbrella system 1 can additionally include an axle to further support rotation of the gear 50. However, in the depicted embodiment the arcing flanges 55 can also provide sufficient support for the rotation of the gear 50 absent an axle. In the embodiment of FIGS. 6A-6B, the gear 50 is supported for rotation without an axle.

The side covers 54 and their arcing flanges 55 can additionally include various openings. For example, the side covers 54 can include angular openings 58a, as depicted in FIGS. 6A, 6B. The angular openings 58a can have wedge shapes, extending from the periphery of the side covers 54 to just past their centers. The angular openings 58a can provide clearance for the rotation connectors 44 through a variety of positions, allowing the connectors to move within the hole 52, as discussed further below. For example, the angular openings 58a can be sufficiently deep to allow motion of the rotation connectors 44 extending to a center of the gear 50. In some embodiments the angular openings 58a can span an angle of approximately 50 degrees. In further embodiments, the angular openings 58a can span an angle between 30 and 70 degrees, 40 and 60 degrees, or 45 and 55 degrees.

Further, the side covers 54 can include a ratchet opening 58b. The ratchet opening 58b, as depicted, can be defined by a relatively narrow opening in the arcing flanges 55. The ratchet opening 58b can receive a directional ratcheting member 60, depicted as a directional pawl. The directional pawl 60 can be rotatably mounted to the side covers 54, within the ratchet opening 58b. Further, the directional pawl 60 can be biased to rotate toward the gear 50, e.g. by a torsional spring, a resilient plate, or the like. In other embodiments, the bias can internal to the directional ratcheting member 60, such as where the rotatability with respect to the side covers 50 is provided by a resiliently flexible portion of the ratcheting member. This ratcheting member can then form a ratcheting relationship with the gear 50, to substantially allow relative rotation in a first direction and substantially hinder relative rotation in a second direction opposite the first direction. However, in other embodiments the ratcheting relationship can be formed in other ways, such as by proving one or more pawls on the gear 50 and teeth on the side covers 54.

Additionally, the side covers 54 can include a control opening 58c. The control opening 58c can be generally opposite the angular opening 58a, although other positions are possible. The control opening 58c can be defined generally at the periphery of the gear 50, forming a gap in the arcing flange 55. As shown, the control opening 58c can provide sufficient clearance for the rotation of an actuating member 66. In some embodiments the control opening 58c can span an angle of approximately 85 degrees. In further embodiments, the control opening 58c can span an angle between 60 degrees and 120 degrees, 70 degrees and 100 degrees, or 80 degrees and 90 degrees. Additionally, as depicted, the control opening 58c can provide clearance for another ratcheting member, depicted as a control pawl 62, rotatably mounted to the actuating member 66, and biased toward the gear 50 by a structure such as those discussed above. This control pawl 62 can be disposed sufficiently close to the gear 50 to form a ratcheting relationship with the gear. The ratcheting relationship can substantially allow relative rotation in a first direction and substantially hinder relative rotation in a second direction opposite the first direction. Again, the ratcheting relationship can be provided by other elements and configurations in other embodiments.

The actuating member 66 can comprise two mounting tines 68 that can rotatably mount the actuating member to an actuator receiving portion 70 on the housing 19, as best depicted in FIG. 2A, 2B. The actuator receiving portion 70 can be disposed such that the axis of rotation of the actuating member 66 is approximately collinear with the axis of rotation of the gear 50. Thus, the ratcheting member 62 on the actuating member 66 can remain in a position substantially close to the gear 50 while the actuating member and/or the gear rotates.

Further, the actuating member 66 can comprise a pad portion 67 with a broadened surface area, at which an actuating pressure or force can be applied. In some embodiments, this pad 67 can be at a substantially low position such that the actuating member 66 can serve as a foot pedal. As will now be described, actuation of this actuating member 66 can cause the deployment and retraction of the wheel assemblies 20.

As best depicted in FIGS. 6A and 6B, the ratcheting member 62 can be in the form of a control pawl and be attached to the actuating member 66. As the control pawl 62 can be biased toward the gear 50, it can interact with the teeth of the gear 50 to form a ratcheting relationship as discussed above. Thus, relative rotation between the gear 50 and the actuating member 66 can be substantially allowed in a first direction and substantially hindered in a second direction. In FIG. 6A the actuating member 66 can be in a raised position. From here, an operator can apply a force downward on the pad 67 of the actuating member 66 to cause the member to rotate about the actuator receiving portion 70. A corresponding relative rotation with the gear 50 can be substantially hindered by the ratcheting relationship (referred to above as rotation in a second direction). More specifically, the control pawl 62 can press against a substantially concave surface of a tooth of the gear 50. The concave surface of the tooth can substantially prevent slipping between the tooth and gear 50. Thus, the gear 50 can rotate with the actuating member 66, with the rotational force or torque being provided by the control pawl 62 onto the gear. When the concave surface is oriented in a counter-clockwise direction, clockwise rotation of the actuating member can cause a clockwise rotation of the gear 50. However, on other embodiments these directions of rotation can be reversed, e.g. by reversing the orientations of the pawls/teeth.

It will be noted that the directional ratcheting member 60 can allow this rotation of the gear 50 relative to the side covers 54. This can be provided by the directional pawl 60 interacting with a convex surface of the teeth of the gear 50. The convex surface can allow the pawl 60 to move away, allowing the gear tooth to rotate past the pawl (e.g., as described above, relative rotation in a first direction). Thus, the gear 50 can rotate in a clockwise direction relative to the housing 19 and other portions of the base assembly 10 and the umbrella system 1. However, the directional ratcheting member 60 can substantially hinder relative rotation in the opposite, counter-clockwise direction (referred to above as the second direction).

This rotation of the gear 50 can also result in a rotation of the hole 52. As the hole 52 can be offset from the center of the gear 50, its location can rotate about the other portions of the control assembly 40. Multiple actuations of the actuating member 66 (or multiple pumps of a foot pedal) can allow the gear 50 (and the hole 52) to make a full revolution any number of times. Thus, the control assembly 40 can provide a cyclic motion of control. In other embodiments such cyclic control can be provided by other features, such as by rotation of a cam shaft, motion along a closed loop, or the like.

As discussed above, the rider 46 can be mounted within the hole 52. As the rider 46 rotates about the hole 52, its position relative to the housing 19 (or other fixed components) can change with the position of the hole. The rider 46 can be generally biased toward the wheel assembly 20b (as will be discussed further below), and thus the friction reducing member can generally tend toward the edge of the hole 52 closest to the wheel assembly.

Comparing FIGS. 6A and 6B, it can be seen that as the hole 52 moves between a position near the wheel assembly 20b (FIG. 6A) to a position far from the wheel assembly (FIG. 6B), the wheel assembly can move between retracted and deployed positions. In FIG. 6A, the hole 52 can be relatively closer to the housing pivot 26 of the wheel assembly 20b, allowing the rotation connector 44 to extend further toward (or past) the housing pivot. The movement of the rotation connector 44 can then allow the wheel assembly 20b to rotate away from the gear 50, about the housing pivot 26 and into the retracted position of FIG. 6A. The wheel assembly 20b can tend toward this retracted position due to the weight of the load applied to the base assembly 10. Thus, the rotation connector 44 and the rider 46 can be biased toward the wheel assembly 20b.

In FIG. 6B, the hole 52 can be relatively further away from the housing pivot 26, causing the rotation connector 44 to move in the same direction. Thus, the rotation connector 44 can pull the wheel assembly 20b back, to rotate in the opposite direction relative to the housing pivot 26, into the deployed position of FIG. 6B. As described above, these positions can coincide with similar deployed and retracted positions of the other wheel assemblies 20a, as depicted in FIGS. 7A, 7B and described above.

Thus, by these elements the base assembly 10 can raise and lower an umbrella system 1 (or another load) onto and off of one or more wheels 22. Further, the base assembly 10 can have elements that reduce the force necessary to raise and lower the load. For example, as depicted the actuating member 66 is in the form of a lever arm, providing a mechanical advantage to an operator. Further, the ratcheting elements can facilitate multiple actuations of the actuating member 66, such that any force magnified by a mechanical advantage can easily be applied a plurality of times without reversing the direction of movement of a control element such as the gear 50. If such a reversing were allowed, the results of the previous actuation could be undone in some embodiments.

Additionally, the base assembly 10 can be configured to resist a downward force from the load, which might otherwise push the wheels 22 into a retracted position. Such a downward force would tend to push the entire base assembly 10 downward, until the cover 14 contacts the ground in the depicted embodiment. The wheels 22 can resist this, but if allowed to rotate freely the force of the load could push them into the retracted position. Such a motion of the wheels 22 would in turn cause the gear 50 to turn in the depicted embodiment, via interactions between the hole 52 and the rotation connector 44. However, this rotation can be resisted by at least two aspects of the control assembly 40.

First, the directional ratcheting member 60 can interact with the gear 50 to substantially hinder any reverse rotation of the gear 50. Thus, for example, the return of the actuating member 66 to a pre-actuation position (e.g., moving the foot pedal to its upper position) will generally not cause the gear 50 to rotate back in a similar motion. Thus, when the load pressed on the base assembly 10 generally pushes the wheel 22 toward a retracted position, and that motion corresponds with a reversal of the gear 50, the directional ratcheting member 60 can resist that motion. This can substantially ensure that the gear 50 does not rotate back with the actuating member 66 as it is reset. However, in other embodiments such ratcheting relationships can be removed.

Second, the rotation connector 44 can be positioned to generally be directed toward or be aligned with the center of the gear 50. More specifically, the rotation connector 44 can extend between two pivot points: the control pivot (defined in the depicted embodiment here by the pin 42) and the rider 46. A line drawn between the control pivot 42 and the rider 46 can pass substantially close to the center of the gear 50. With some shapes and orientations as such, a tension or compression of the rotation connector 44 can provide a force on the gear 50 that is directed substantially through its rotational center. Thus, a relatively large force can create a relatively small torque on the gear 50, and not substantially urge the gear to rotate.

Advantageously, the wheel assembly 20b, and more particularly its control pivot 42, can be positioned to provide this relationship. Further, the control pivot 42 can be positioned such that the orientation of the connector 44 does not significantly change as the wheel assembly 20b rotates. For example, in some embodiments the movement of the control pivot 28 during movement of the wheel assembly 20b can be substantially small relative to the length of the rotation connector 44. Further, in some embodiments a curved path of the control pivot 28 can be substantially in line with the orientation of the rotation connector 44. Thus, the rotation connector 44 can remain substantially in line with the center of the gear 50 throughout its motion. However, in other embodiments the rotation connector 44 can be oriented otherwise.

Additionally, in the depicted embodiment the deployed position of the wheel assemblies 20 can substantially resist forces from the load that may push the wheels 22 to retracted positions. For example, as depicted in FIGS. 6B, 7B, the wheel assemblies 20 can be substantially perpendicular to the ground when in the deployed position. Thus, a force from the ground can be oriented in substantial alignment with a rotational axis of the wheel assemblies (such as the housing pivot 26), providing a relatively small torque. However, in other embodiments the deployed positions can be in another position.

Although described as supporting a load, in some embodiments the control assembly 40 can be used in other contexts. For example, in some embodiments the control assembly 40 can control a reversible jack, a braking system, a locking mechanism or the like. In such embodiments, the control assembly 40, including elements such as the gear 50 and the ratcheting members 60, 62 can be separated from the housing 19 and other elements of the umbrella assembly 1. The control assembly 40 can then be integrated into an alternative assembly with which it will be used.

The umbrella system 1 can be formed from a variety of materials. For example, in some embodiments a majority of the base assembly 10 can be metal, such as the side housing frame 18. However, the wheels 22 and pins 42 can be formed from other materials, such as a hardened plastic. The use of other materials is also contemplated as part of any of the embodiments described above.

Although the foregoing description of the preferred embodiment of the present invention has shown, described, and pointed out the fundamental and novel features of the invention, it will be understood that various omissions, substitutions, and changes in the form of the detail of the apparatus as illustrated, as well as the uses thereof, may be made by those skilled in the art without departing from the spirit of the present invention.

What is claimed is:

1. A base assembly comprising:
   a load supporting frame comprising one or more wheels movable between deployed and undeployed positions;
   a circular ratcheting gear rotatably mounted to the load supporting frame and comprising a plurality of teeth and an eccentric opening within the circular ratcheting gear;
   a first ratcheting pawl coupled to the load supporting frame, the first ratcheting pawl being adjacent the ratcheting gear to form a ratcheting relationship with the ratcheting gear substantially allowing rotation of the ratcheting gear in only a first direction relative to the first ratcheting pawl;
   an elongated member pivotably mounted within the opening and comprising a second ratcheting pawl mounted to the elongated member adjacent to the ratcheting gear to form a ratcheting relationship with the ratcheting gear substantially allowing rotation of the ratcheting gear in only the first direction relative to the second ratcheting pawl; and
   a linkage pivotably mounted within the opening and pivotably mounted to one or more of the wheels,
   wherein pivoting of the elongated member in one direction causes a rotation of the ratcheting gear relative to the first ratcheting pawl and no rotation relative to the second ratcheting pawl, the second ratcheting pawl being disposed to move with the elongated member to push the ratcheting gear into rotation with the elongated member; and
   wherein rotation of the ratcheting gear relative to the first ratcheting pawl can cause a movement of the opening that causes a movement of the linkage to move the one or more wheels between the deployed and undeployed positions.

2. The base assembly of claim 1, wherein the load comprises an umbrella.

3. The base assembly of claim 1, the linkage comprises a friction-reducing member.

4. The base assembly of claim 1, further comprising a cover removable from the frame.

5. The base assembly of claim 4, wherein the wheels extend beyond the cover in the deployed position.

6. The base assembly of claim 4, wherein the wheels are substantially retracted into the cover in the undeployed position.

7. The base assembly of claim 1, wherein the linkage comprises an extended bar mounted within the opening, wherein the extended bar is generally elongated and substantially aligned with a rotational center of the ratcheting gear.

8. The base assembly of claim 1, wherein the gear is mounted without an axle.

9. A base assembly comprising:
   a load supporting frame comprising one or more recesses and a mounting portion configured to support a load;
   one or more wheels pivotably mounted to the load supporting frame and movable between deployed and undeployed positions extending from said one or more recesses to support and lift the load;
   a cyclic driving assembly mounted to the frame such that actuation of the driving assembly causes the assembly to move in a first direction to define a continuing cyclic motion of the driving assembly; and
   a linkage between the cyclic driving assembly and the one or more wheels translating the continuing cyclic motion from the driving assembly to the one or more wheels such that the one or more wheels have a continuing cyclic motion between the deployed and undeployed positions.

10. The base assembly of claim 9, wherein the mounting portion is configured to support a load bearing pole.

11. The base assembly of claim 9, further comprising a cover removable from the frame.

12. The base assembly of claim 11, wherein the wheels extend beyond the cover in the deployed position.

13. The base assembly of claim 11, wherein the wheels are substantially retracted into the cover in the undeployed position.

14. The base assembly of claim 9, wherein the cyclic driving assembly allows motion in a first direction and hinders motion in a second direction.

15. The base assembly of claim 9, wherein the cyclic driving assembly further comprises a gear that is mounted without an axle.

16. A ratcheting assembly comprising:
    a housing;
    a ratcheting gear rotatably mounted within the housing and comprising a plurality of ratchet teeth and an eccentric opening, the eccentric opening including a rotational center of the ratcheting gear;
    a first ratchet pawl mounted to the housing adjacent to the ratcheting gear to allow rotation in a first direction and to hinder rotation in a second direction opposite the first direction;
    a motion translation member mounted within the opening such that rotation of the ratcheting gear causes a movement of the motion translation member via rotation of the eccentric opening; and
    a ratcheting actuation member mounted to the housing and comprising a second ratchet pawl mounted to the ratcheting actuation member adjacent to the ratcheting gear such that actuation of the ratcheting actuation member in the first direction can cause a rotation of the ratcheting gear and actuation of the ratcheting actuation member in the second direction opposite the first direction does not cause a rotation of the ratcheting gear.

17. The ratcheting assembly of claim 16, wherein the motion translation member comprises a friction reducing member mounted within the opening.

18. The ratcheting assembly of claim 16, wherein the ratcheting actuation member comprises a lever.

19. The ratcheting assembly of claim 18, wherein the lever comprises a foot pedal.

20. The ratcheting assembly of claim 18, wherein the first direction corresponds with a downward motion of the lever.

21. The ratcheting assembly of claim 16, wherein the gear is rotatably mounted without an axle.

22. A method for controlling a base assembly comprising:
pumping an actuating member a plurality of times in a first direction to incrementally deploy one or more wheels to lift a base assembly on said wheels; and
pumping the actuating member a plurality of times in the first direction to incrementally retract the plurality of wheels to lower the base assembly off of said wheels.

23. The method of claim 22, wherein the one or more wheels are in a stable position at the termination of each pump.

24. The method of claim 22, further comprising the step of repeating the two pumping steps a plurality of times.

25. The method of claim 22, wherein the pumping steps cause the rotation of a gear.

26. The method of claim 22, wherein the base assembly bears a substantial load.

* * * * *